(12) United States Patent
Adams

(10) Patent No.: US 9,273,803 B2
(45) Date of Patent: Mar. 1, 2016

(54) EAVES CLIP

(75) Inventor: William E. Adams, Portersville, PA (US)

(73) Assignee: Adams Mfg. Corp., Portersville, PA (US)

( * ) Notice: Subject to any disclaimer, the term of this patent is extended or adjusted under 35 U.S.C. 154(b) by 2199 days.

(21) Appl. No.: 11/287,545

(22) Filed: Nov. 23, 2005

(65) Prior Publication Data

US 2007/0114340 A1  May 24, 2007

(51) Int. Cl.
  *F16L 3/00* (2006.01)
  *F16L 3/13* (2006.01)
  *F16L 3/127* (2006.01)

(52) U.S. Cl.
  CPC .. *F16L 3/13* (2013.01); *F16L 3/127* (2013.01)

(58) Field of Classification Search
  USPC ........ 248/51, 74.2, 74.4, 316.7, 230.7, 228.7, 248/231.81, 229.16, 229.26; 24/460, 459
  See application file for complete search history.

(56) References Cited

U.S. PATENT DOCUMENTS

| | | | | |
|---|---|---|---|---|
| 769,418 A * | 9/1904 | Vancore | ...................... | 70/456 R |
| 2,251,744 A * | 8/1941 | Kurath et al. | .................. | 24/546 |
| 2,707,052 A * | 4/1955 | Brown | ............................. | 211/65 |
| 3,066,368 A * | 12/1962 | Czapar | ............................ | 74/495 |
| 3,883,926 A | 5/1975 | Reynolds | | |
| 4,843,707 A * | 7/1989 | Lake et al. | ...................... | 29/432 |
| D306,553 S | 3/1990 | Rumpel | | |
| 5,141,192 A | 8/1992 | Adams | | |
| 5,288,047 A | 2/1994 | Pan | | |
| 5,474,268 A * | 12/1995 | Yu | ................................... | 248/61 |
| D368,219 S | 3/1996 | Protz, Jr. | | |
| D376,973 S | 12/1996 | Brown | | |
| 5,613,656 A | 3/1997 | Protz, Jr. | | |
| D379,060 S * | 5/1997 | Laga | ............................... | D8/373 |
| D385,776 S | 11/1997 | Protz, Jr. | | |
| D393,201 S | 4/1998 | Hearidge et al. | | |
| D426,425 S * | 6/2000 | Hermanski | .................... | D7/400 |
| 6,255,569 B1 * | 7/2001 | Ward | .............................. | 84/329 |
| 6,378,827 B1 | 4/2002 | Kacines | | |
| 6,443,401 B1 * | 9/2002 | Vanderpan | ...................... | 248/62 |
| 6,663,069 B1 | 12/2003 | Norberg | | |
| 6,848,660 B2 | 2/2005 | Jackson | | |
| 7,152,831 B2 * | 12/2006 | Riedy et al. | .................. | 248/68.1 |
| 2004/0129846 A1 | 7/2004 | Adams et al. | | |

* cited by examiner

*Primary Examiner* — Steven Marsh
(74) *Attorney, Agent, or Firm* — Buchanan Ingersoll & Rooney PC

(57) ABSTRACT

A clip for hanging decorative lights from the eaves of a house has an elongated C-shaped body. This body has an intermediate curved section extending between two ends that curve inwardly. A hook is attached to the outside surface of the intermediate curved section. The elongated body is made of a flexible plastic having a memory such that the curved ends may be moved away from one another by a force acting on at least one of the distal ends. When the force is removed the memory will cause the distal ends of the clip to move together. The inward curvature enables the curved ends to unravel to some extent. The combination of the unraveling of the ends and the flexing of the curved intermediate portion enables this clip to fit onto eaves ranging in width from ⅝ inch to over two inches without breaking.

10 Claims, 1 Drawing Sheet

EAVES CLIP

FIELD OF THE INVENTION

The invention relates to hooks and clips used for hanging strings of decorative lights and like objects from eaves of a house or other building.

BACKGROUND OF THE INVENTION

During holiday seasons many homeowners place decorations on and around their houses. One popular way to decorate a house is to attach strings of decorative lights to the edge of the roof or eaves of the house. It has been known to attach decorative light strings by using staples or hooks which are attached to the eaves. This type of attachment creates holes in the wood when the staples or hooks are removed.

Another type of eaves hook involves a generally U-shaped clip which fits over the eaves. One example of such a clip is disclosed in U.S. Pat. No. 3,883,926 to Reynolds. This clip has a flat base containing a hole in which the socket of a decorative light is held. Two arms extend upward from opposite edges of the base and are directed inward toward one another. At the distal end of each arm there is a tab extending outward from the arm. The tabs, arms and base are preferably formed as a single flexible plastic piece, but could be made of metal. A similar Christmas light clip is disclosed in U.S. Pat. No. Des. 306,553 to Ruppel. One disadvantage of this type structure is that the clip can easily be dislodged from the eaves to which it is attached. Another problem is that the shape and flexibility of the arms provide a limited range of widths of boards to which the clip can be attached without slipping or breaking. Clips designed for use on eaves having a width of ⅝ inch should not be used on a 2 inch width unless the height of the arms is relatively long rendering the clip unless on eaves having a height of an inch or less.

Protz, Jr. in U.S. Design Pat. Nos. 368,219 and 385,776 discloses U-shaped clips used to hold Christmas lights on gutters. These clips are similar to that disclosed by Reynolds, but have somewhat different shapes. The distal ends of these clips curve outward with a gradual curvature. Pan in U.S. Pat. No. 5,288,047 discloses yet another clip for holding decorative light bulbs. This clip has two oppositely disposed U-shaped clips in which the outer ends curve outwardly. The disadvantage of this type of clip again is that that the clips can hold onto a fairly narrow range of board or product widths.

The U-shaped clips disclosed by Reynolds and Protz, as well as similarly shaped clips, are typically made of plastic such as polycarbonate. When the arms of these clips are spread apart, stress on the material is concentrated along the joints between the arms and the base. Repeated opening and closing of the arms or opening the arms too wide will cause the clip to break or to weaken along these joints. Such weakening in a clear or translucent polycarbonate clip is often evidenced by a white stress mark.

Consequently, there is a need for a clip for holding decorative lights which will hold securely on eaves of a house and wherein the width of the eaves may range from ⅝ inch to over 2 inches, and the height of the eaves ranges from less than an inch to several inches. These clips should not break or weaken during normal and repeated use.

SUMMARY OF THE INVENTION

I provide an eaves clip having an elongated C-shaped body. This body has an intermediate curved section extending between two ends that curve inwardly. A hook is attached to the outside surface of the intermediate curved section. The elongated body is made of a flexible plastic having a memory such that the curved ends may be moved away from one another by a force acting on at least one of the curved ends. When the force is removed the memory will cause the distal ends of the clip to move together. The inward curvature enables the curved ends to unravel to some extent. Thus, the combination of this unraveling of the ends and the flexing of the curved intermediate portion enables this clip to fit onto eaves ranging in width from ⅝ inch to over two inches without breaking.

I further prefer to provide teeth on the curved ends to improve the gripping surface.

I also prefer to provide a reinforcing rib on either or both the inside surface or the outside surface of the elongated body.

Other objects and advantages of the present invention will become apparent from a description of certain present preferred embodiments shown in the drawings.

DESCRIPTION OF PREFERRED EMBODIMENTS

Figure 1:
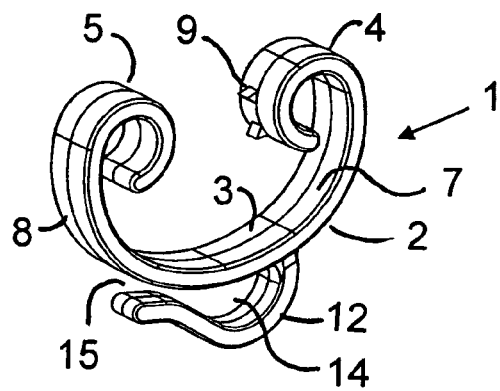
FIG. 1 is a perspective view of a present preferred embodiment of my eaves clip.
Figure 2:
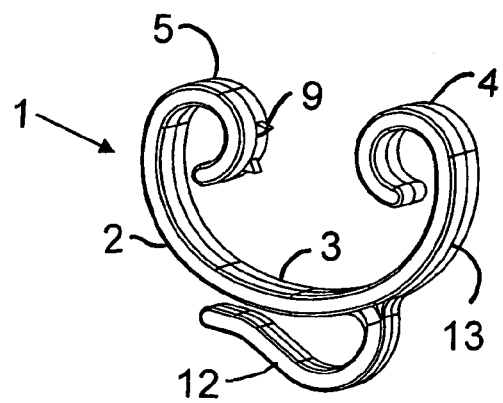
FIG. 2 is a second perspective view of the embodiment shown in FIG. 1.
Figure 3:
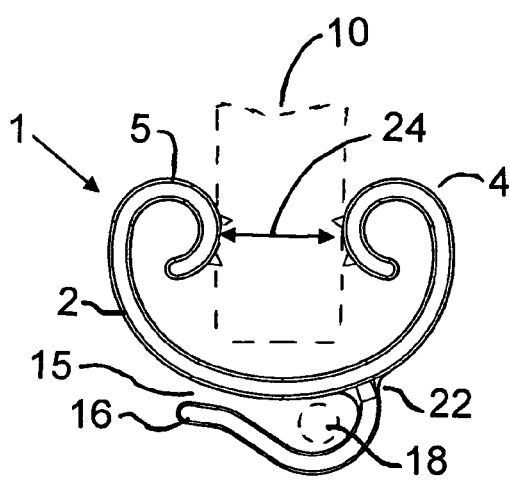
FIG. 3 is a side view of the embodiment shown in FIGS. 1 and 2.

The present preferred eaves clip 1 shown in the figures has an elongated ribbon shaped body 2. This body has an intermediate curved section or portion 3 extending between curved ends 4 and 5. The curved ends 4 and 5 are generally spiral shaped and integrally formed with the intermediate section 3. The curved ends 4 and 5 curve inward around an arc greater than 180°. The ends 4, 5 and intermediate portion 3 have an inside surface 7 and an outside surface 8. I prefer to provide teeth 9 on the outside surface of each curved end 4 and 5. As can be seen in FIG. 3, these teeth can bite into the eaves 10 or other object shown in dotted line to which the eaves clip is attached. The region where hooks 9 are provided could be flat rather than curved. This flat area would rest against the surface of the eaves and may or may not have teeth. A hook 12 extends from the outside surface of the intermediate portion 3. This hook is configured so that the hook and intermediate portion define a cavity 14 which is accessed through a mouth 15. The diameter of the cavity 14 is larger than the opening of the mouth 15. The hook 12 is preferably integrally molded with body 2 of a plastic material such as polycarbonate. Consequently, the distal end 16 of the hook 12 can be moved away from the intermediate portion of the body to allow the cord portion of a decorative light string 18, shown in chain line in FIG., 3 to be fitted within the cavity 14. After the cord 18 is inside the cavity, the hook 12 will flex to its original position keeping the cord 18 within the cavity 14.

The eaves clip shown in the drawings can be easily molded in a two piece mold having a parting line 13 along the center of the inside surface and outside surface of the elongated body. If desired, one could provide a reinforcing rib along the parting line of either or both the inside surface or the outside surface.

Figure 4:
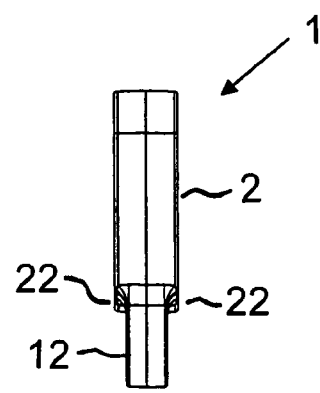
FIG. 4 is an end view of the embodiment shown in FIGS. 1, 2 and 3.

As can be seen most clearly in FIGS. 3 and 4, the hook 12 has a width smaller than the width of the elongated body 2. I prefer to provide a radius portion 22 along each side of the hook where it meets the outer surface of the elongated body. This radius portion 22 provides additional support for the clip. Consequently, the hook is less likely to break at that point than it would be without the radius surfaces.

In the preferred embodiment shown in the drawings the hook 12 is centered on the intermediate section. If desired, the hook could be positioned closer to either of the curved ends. The hook could be molded with its opening at right angles to the body of the clip so that the clip can hold lights on eaves that are perpendicular to the side of the house. Two or more hooks could be provided. Furthermore, the hook could be an eyelet or any other shape which will hold an object. Indeed, a knob could be molded onto the outside surface and function as a hook. Consequently, any projection to which an object can be attached could be provided.

In order to place the eaves clip on the eaves or other object, one can simply position the eaves clip below the eaves and push upward causing the ends to flex apart. Another way of attaching the eaves clip is to tilt the clip shown in FIG. 3 at an angle such that one end 5 engages the eaves. Then one pulls on the opposite end 4 spreading the ends 4 and 5 apart. Once the two ends have been spread apart a sufficient distance, one then lifts end 4 upward and releases. After that end is released it will flex back toward the opposite end 5. The memory of the clip will apply a force to the ends retaining the clip on the eaves.

One advantage of the present clip is that the clip can both flex and unravel to some extent to accommodate the eaves to which the clip is attached. The entire elongated body is a spring. When the clip is opened the curved portion is under stress and the curved end or ends are under compression. The forces are distributed throughout the elongated body making breakage or weakening less likely than in conventional U-shaped clips. The present preferred eaves clip has an opening indicated by arrow 24 in FIG. 3 of ⅝ inch when in a relaxed condition. Since the eaves on some houses are ⅝ inch in width, distance 24 should be more than ⅝ inch when the eaves clip is in a relaxed position. The clip ends 4, 5 can be pulled apart such that the distance 24 would be as much as 2 inches. Thus, the present eaves clip can be fitted over eaves from ⅝ inch to 2 inches. When placed on a ⅝ inch width eaves the teeth 9 would provide sufficient friction between the clip and the eaves to hold the clip in place.

The present clip was designed primarily for use on the eaves of a house; but, its use is not so limited. The clip could be used on shelves, frames or other structures to hold a variety of objects. Larges sizes than the preferred size just described could be made. For, example, a large clip in which the ends of the eaves clip are 2 to 4 inches apart when the clip is in a relaxed position could be used to hold a flag or flowers in a grave marker. Although I have described and illustrated certain present preferred embodiments of my eaves clip it should be distinctly understood that the invention is not limited thereto, but may be variously embodied within the scope of the following claims.

I claim:

1. A clip comprising:
    an elongated C-shaped body having two curved ends, an intermediate curved section extending between the two ends, an inside surface and an outside surface, the two curved ends each having a single curved section extending from the intermediate curved section and the single curved section terminating at a distal end of the curved end, the curved section curving inward toward the inside surface of the elongated body over an arc greater than 180°, the elongated body made of a flexible material having a memory such that the curved ends may be moved from a relaxed position away from one another by a force acting on at least one of the curved ends such that when the force is removed, the memory will cause the curved ends to move toward the relaxed position; and
    a projection on which an object may be held; the projection immovably attached to the outside surface and the intermediate curved section of the elongated C-shaped body.

2. The clip of claim 1 wherein the curved ends of the eaves clip when in the relaxed position are separated by a distance of not more than ⅝ inches.

3. The clip of claim 2 wherein the elongated body is made of a material such that curved ends of the eaves clip may be separated at least two inches from one another without breaking the elongated body by a force acting on at least one of the curved ends.

4. The clip of claim 2 wherein the elongated body is made of a material such that curved ends of the eaves clip may be separated at least two inches from one another without weakening the elongated body by a force acting on at least one of the curved ends.

5. A clip comprising:
    an elongated C-shaped body having two curved ends, an intermediate curved section extending between the two ends, an inside surface and an outside surface, the two curved ends each having a single curved section extending from the intermediate curved section and terminating at a distal end, the curved section curving inward toward the inside surface of the elongated body over an arc greater than 180°, the elongated body made of a flexible material having a memory such that the curved ends may be moved from a relaxed position away from one another by a force acting on at least one of the curved ends such that when the force is removed, the memory will cause the curved ends to move toward the relaxed position;
    a projection on which an object may be held attached to the outside surface and the intermediate curved section of the elongated C-shaped body; and
    at least one tooth attached to at least one of the curved ends.

6. The clip of claim 1 also comprising a flat area provided on at least one of the curved ends.

7. The clip of claim 1 wherein the elongated C-shaped body and the projection are an integrally molded plastic structure.

8. The clip of claim 7 wherein the integrally molded plastic structure is polycarbonate.

9. The clip of claim 1 wherein the projection is configured and positioned so that the projection and intermediate section define a mouth and a cavity, the mouth having a width and the cavity having a width greater than the width of the mouth.

10. The clip of claim 1 wherein the projection is a hook, knob or eyelet.

* * * * *